United States Patent [19]

Carmichael et al.

[11] 3,992,713

[45] Nov. 16, 1976

[54] INK JET PRINTING SYSTEM WITH PEDESTAL SYNCHRONIZATION

[75] Inventors: John Michael Carmichael, Nicholasville; Roderick Stacey Heard, Lexington; Harry Parmer Heibein, Lexington; John Alfred Lowy, Lexington; Richard William McCornack, Lexington, all of Ky.

[73] Assignee: International Business Machines Corporation, Armonk, N.Y.

[22] Filed: June 20, 1975

[21] Appl. No.: 588,579

[52] U.S. Cl. .......... 346/75; 346/1

[51] Int. Cl.² .......... G01D 15/18

[58] Field of Search .......... 346/1, 75

[56] References Cited

UNITED STATES PATENTS

| | | | |
|---|---|---|---|
| 3,298,030 | 1/1967 | Lewis et al. | 346/75 |
| 3,852,768 | 12/1974 | Carmichael et al. | 346/75 |
| 3,886,564 | 5/1975 | Naylor et al. | 346/75 |
| 3,898,671 | 8/1975 | Berry et al. | 346/75 |

OTHER PUBLICATIONS

F. E. Jackson, Digital Phase Control for Ink Jet Printing, Nov., 1973, vol. 16, No. 6, IBM Technical Disclosure Bulletin, pp. 1890–1891.

*Primary Examiner*—George H. Miller, Jr.
*Attorney, Agent, or Firm*—John W. Girvin, Jr.; D. Kendall Cooper

[57] ABSTRACT

An ink jet printing system is provided with synchronization facilities including charging, deflecting, and gutter components and a technique is described for referencing synchronizing pulses to a pedestal voltage level to insure that the ink drop stream clears the gutter during synchronization cycles.

12 Claims, 15 Drawing Figures

INK JET PRINTING SYSTEM WITH PEDESTAL SYNCHRONIZATION

BACKGROUND OF THE INVENTION AND PRIOR ART

As Background, the following U.S. Pat. Nos. are of interest:

Hill, et al 3,769,630; Fillmore, et al 3,787,882; Carmichael, et al 3,852,768 and Naylor, et al 3,886,564. The present case is distinguishable from this art since none of the art describes synchronization making use of a pedestal voltage level. The Hill, et al patent describes a variety of synchronizing and checking procedures. The Fillmore, et al patent of background interest as describing a servo control system for an ink jet printer. The Carmichael, et al and Naylor, et al cases describe sensors that are useful in practicing the synchronization procedures in the present case.

SUMMARY OF THE INVENTION

During synchronization procedures in an ink jet printing system, which involve the synchronizing of drop break-off time to the charge applied by the charge electrode, it is possible to charge drops in the stream only partially whereby they may strike the gutter, contaminating it. This is due to the fact that the charge currents are not able to reach the necessary synchronization levels as rapidly as required. Various solutions are presented in the present case, all of which involve the referencing of the charge level to a pedestal voltage level rather than to a zero level, which enables the charge pulses to reach the required levels much more quickly and accurately than is otherwise possible.

OBJECTS

Accordingly, an object of the present invention is to provide synchronization techniques for ink jet printing systems which enable more accurate and efficient synchronization of drop breakoff and charging voltage levels.

An additional object of the present invention is to provide synchronization techniques which eliminate contamination difficulties previously encountered in ink jet printing systems.

Still another object of the present invention is to provide a pedestal reference level for synchronization charge pulses in an ink jet printing system.

The foregoing and other objects, features, and advantages of the invention will be apparent from the following more particular description of the preferred embodiments of the invention as illustrated in the accompanying drawings.

DRAWINGS

DETAILED DESCRIPTION

SYSTEM

Figure 1:
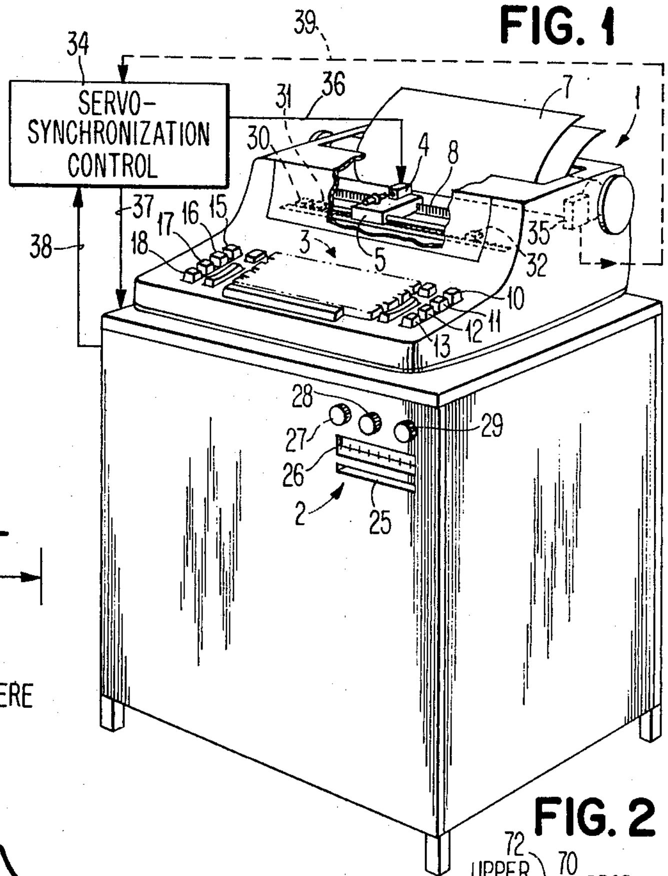
FIG. 1 illustrates an ink jet printing system incorporating pedestal synchronization in accordance with the present invention and having an associated magnetic card recording/reproducing unit.
Figure 3B:
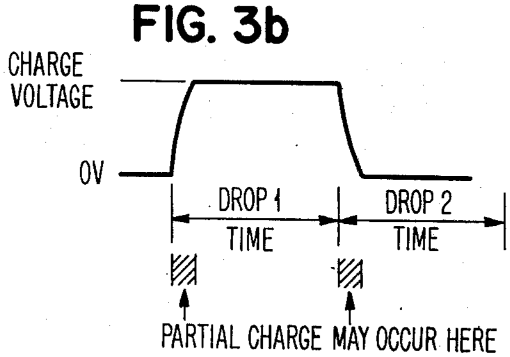
Figure 3C:
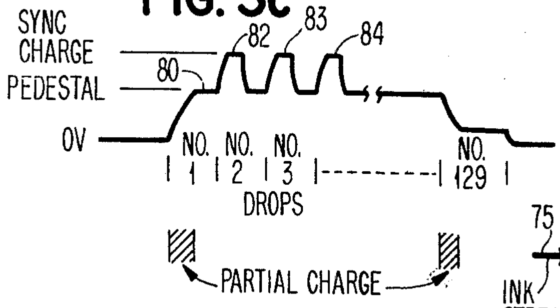

FIG. 1 illustrates an ink jet printing system incorporating a printer 1 with an associated magnetic card recording/reproducing unit 2. Card unit 2 is shown for convenience only and other kinds of storage units, recording/reproducing units, and the like, may be used in the system. Printer 1 has the usual keyboard 3 for entry of characters into the system and control of functions. Printer 1 incorporates an ink jet head assembly 4 arranged on a carrier 5 for travelling movement from left to right (and conversely) adjacent a document 7 to be printed. Assembly 4 has an ink drop nozzle and an associated grating 8 for determination of horizontal position during printer operations. Printer 1 may be provided with various control buttons 10, 11, 12 and 13 for automatic, line, word, and character printing, respectively. Other keybuttons 15–18 concern mode selection, that is, record, playback, adjust, and skip, respectively. Printer 1 incorporates a left margin reed switch 30, a drop carrier return reed switch 31 and a right margin reed switch 32. Located at the right side of printer 1 is a deflection servo sensor and ink catcher assembly 35 to be described in detail shortly.

The system also includes a Servo-Synchronization Control block 34 providing output signals on lines 36 and 37 and receiving command and sensor signals on lines 38 and 39, respectively.

Magnetic card unit 2 has a load slot 25 and a track indicator 26. Also provided on unit 2 is a card eject button 27, a track stepdown button 28 and a track stepup button 29 for relocating the scanning transducer (not shown) with respect to the various tracks on the card.

Figure 4:
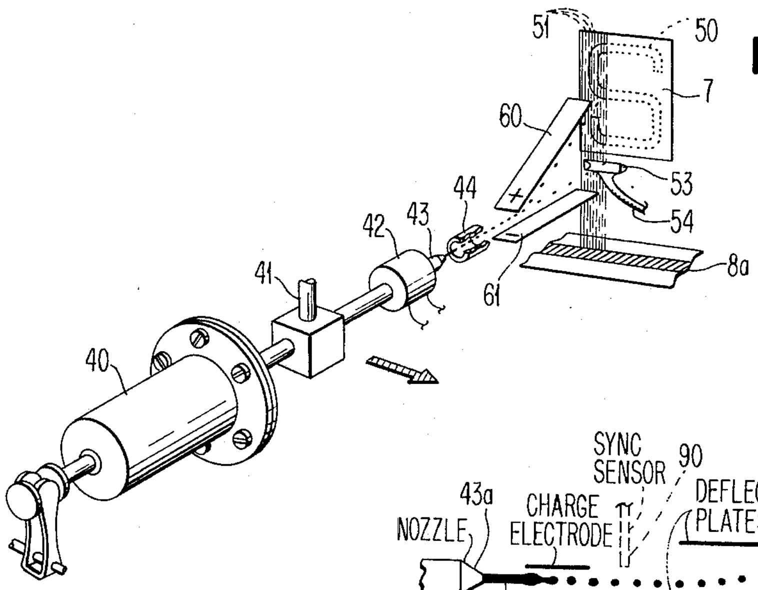
FIG. 4 illustrates a typical ink jet head assembly useful in the ink jet printing system of FIG. 1.

Various structures incorporated in head assembly 4 are illustrated in FIG. 4. This includes a pump 40 for directing ink from an ink supply conduit 41 as a crystal 42 is energized, that is pulsed at high frequencies. The rate of impulsing crystal 42 may be in the range of 117 kiloHertz for example. Ink drops are emitted from nozzle 43 and pass through a charge electrode 44 for variable charging in accordance with the output of a charge amplifier to deflect the drops in a column an amount representing the vertical height of the drop locations in any given character. As illustrated, the capital letter S designated 50 comprises a number of vertical columns 51. The printing is such that a sequence of vertical columns, each comprising a plurality of drops, such as 40 in number, is propelled from nozzle 43 toward document 7 for the printing of the character involved. If drops are not required for printing, they are directed to a gutter 53 for passage by means of a conduit 54 back to the ink supply, customarily. Deflection plates 60 and 61 are positioned above and below the path of travel of the drops leaving the charge electrode 44. A constant high potential is applied across plates 60 and 61 and this, in cooperation with the variable charge on the individual drops determines the amount of deflection as the drops are directed toward document 7. Grating 8*a* in this instance is shown as being positioned horizontally rather than vertically as in FIG. 1, but the positioning is immaterial.

The characters are formed by charging and deflecting drops to the desired location in a 40 drop high raster or scan. For a 10 pitch character, 24 such scans are used to produce a 40 ×24 drop character box. The 24 scans are produced by the horizontal motion of the carrier 5. The 40 drop scans represent a vertical distance of 1/6 inch. Thus, the resolution in both the horizontal and vertical direction is 240 drops/inch. For 12 pitch characters, the character box is 20 scans wide, while the character box for PSM charaters varies from 12 to 28 scans.

SERVO AND SYNCHRONIZATION STRUCTURES AND OPERATIONS - GENERAL INTRODUCTION

SERVO

Figure 2:
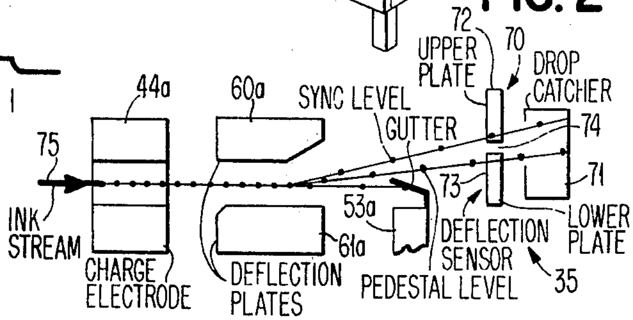
FIG. 2 illustrates implementation of a first embodiment of pedestal synchronization as explained in conjunction with FIGS. 3*a*–3*e*, FIG. 9, which shows phase waveforms.
Figure 3D:
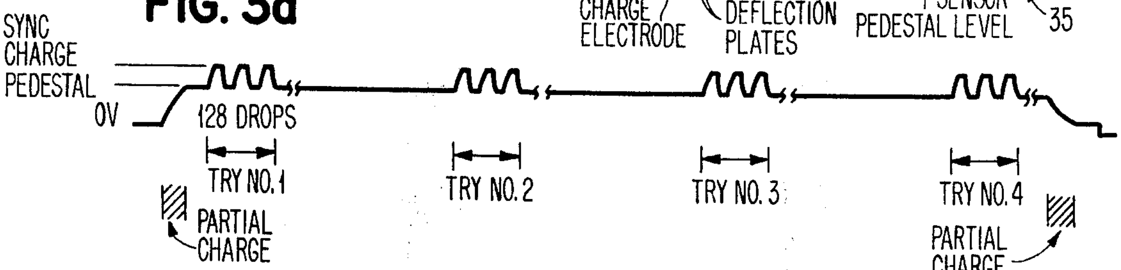
Figure 3E:
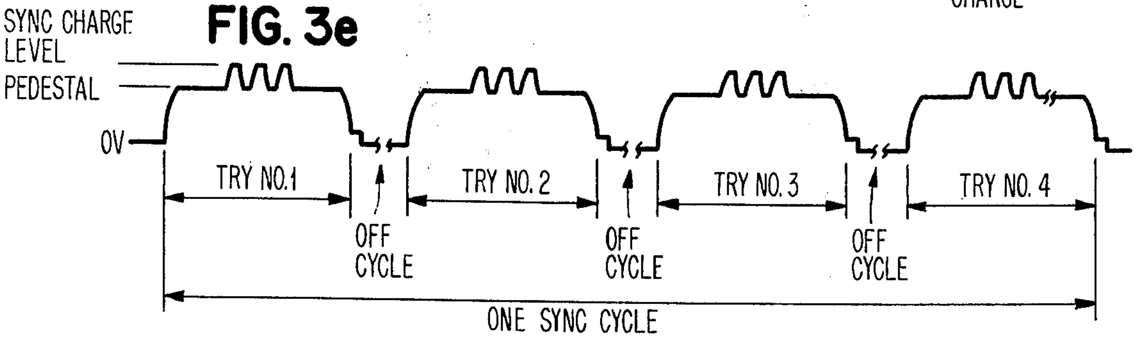

Located at the right side of the printer is an assembly 35 comprising a deflection servo sensor 70 and ink drop catcher 71, shown in more detail in FIG. 2. The servo sensor and associated electronics and logic are used to set and maintain the height of the printed character. On stream startup of the printer, a Servo cycle is performed. Carrier 5 is positioned at the right side of the printer. A pump drive for a pump such as pump 40, FIG. 4, is set to its high drive (highest pressure) and a group of 128 drops in a stream 75 is charged with a set voltage. These drops are deflected and are sensed as they pass the sensor 70. The sensor consists of two plates 72 and 73 with a gap 74 between them and detects whether the group of drops passes above or below the sensor gap. FIG. *3a* is a plot of signal output versus ink drop position derived from a differential amplifier circuit responsive to sensor 70 as taught in the Naylor, et al. patent. At the high pressure, the stream velocity is high and the stream passes below the sensor gap. The pump drive is reduced in set increments and groups of drops are charged and sensed until the drops pass the sensor gap 74. This procedure determines the initial pump drive. After the initial servo operation, servos are performed periodically to compensate for ink viscosity changes that result from temperature changes. On the servos performed after the initial servo, only one group of drops is usually charged and the pump drive is incremented one step in the necessary direction to keep the drops passing the sensor gap 74. The servo operation makes use of drops charged at a voltage level equivalent to drop matrix position 42, based on a 50 drop high matrix referenced from the gutter stream as drop location 0. In this case drop locations 1–40 for characters become 11–50. The charge electrode is brought to drop 42 voltage for the 128 drop times. Since the charge voltage is not pulsing, Sync is not a concern during Servo.

SYNC

A Sync cycle is performed at the completion of each Servo cycle. The purpose of Sync is to insure that drop breakoff and charging occur while the charge pulse is at a stable voltage. This timing can change due to ink or stream changes. Therefore, the sync must be checked periodically and adjusted if necessary. The charge pulse time is divided into four one-half drop time phases. Four groups of drops are charged with the four phases. See FIG. 9. The groups of drops are then deflected past sensor 70. The sync phase is then set depending on which groups of charged drops are detected.

Sensor 70 is used to sense which group or groups of drops cause a high (above the sensor gap) indication through the sensor and associated logic 34. The Sync operation is satisfactorily completed if the group of 128 drops is sensed high or above the sensor gap for one or more adjacent groups but not all four groups.

During the charging of the 128 drops for Sync, the charge electrode is brought to a 40 voltage level equivalent to drop matrix position 40. The half drop time sync pulses are at a voltage level equivalent to drop matrix position 45 and are applied on top of the drop 40 pedestal. If the drop breakoff occurs during the drop 45 voltage time for a given phase, the drop would be deflected above the sensor gap and a high indication would be given. The procedure of the sync charge pulse occurring from a pedestal reduces the voltage transition of the pulses and hence, the rise and fall time.

ADDITIONAL DISCUSSION OF FIRST EMBODIMENT OF FIGS. 2, 3*a*–3*e*, and 9

FIG. 2 includes several structures that are variants of those shown in FIG. 4 including charge electrode 44*a*, deflection plates 60*a* and 61*a* and gutter 53*a*.

As previously indicated, when attempting to synchronize the drop break off to the charge electrode driver it is possible to charge drops to a partial level. These partially charged drops can impact the gutter 53*a*. This problem exists primarily because the charge electrode driver cannot slew instantaneously from zero (0) volts to the charging voltage, and as illustrated in FIG. *3b*, partial charging of drops may occur. There is a very small finite time required to achieve full drop charging.

Figure 9:
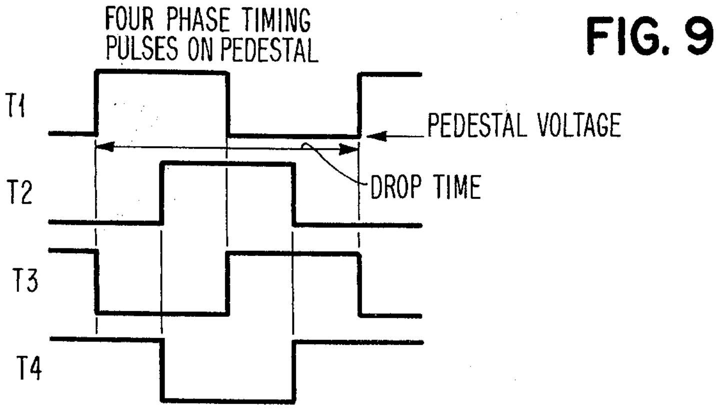

In accordance with the inventive arrangements herein, the possible gutter contamination is reduced to a worst case maximum of two drops per synchronization cycle. This is accomplished by placing the entire ink stream on a voltage pedestal 80, FIG. *3c*. In the first embodiment, the voltage pedestal is of such a magnitude as to guarantee that the stream clears gutter 53*a* and passes by the sensor lower plate 73, FIG. 2. The synchronizing pulses 82, 83, etc. are then applied to the pedestal which causes the charged drops to be deflected past the top sensor plate 72 of sensor 70. FIG. *3d* shows the four pulse groups (Try No. 1, Try No. 2, etc.) used to make up a Sync cycle. In FIG. *3d*, the stream is on a pedestal between each Sync try, that is, it's on the pedestal for the full Sync cycle. The worst case condition of two drops per cycle is true for FIG. *3d*. In FIG. *3e*, the try for synchronization is accomplished by four (4) tries on pedestals with the time between tries having no pedestal. For the method illustrated in FIG. *3e* there are 8 gutter transitions per Sync cycle, but since pedestal on-off times are changed in phase for each try, the worst case is still only two drops per Sync cycle. Only one drop per cycle could hit the gutter if the logic control were to be designed to force all pedestal on and off transitions to occur at different phase times. FIG. 9 shows phase waveforms superimposed on the pedestal in order to establish the sync phasing.

Figure 5:
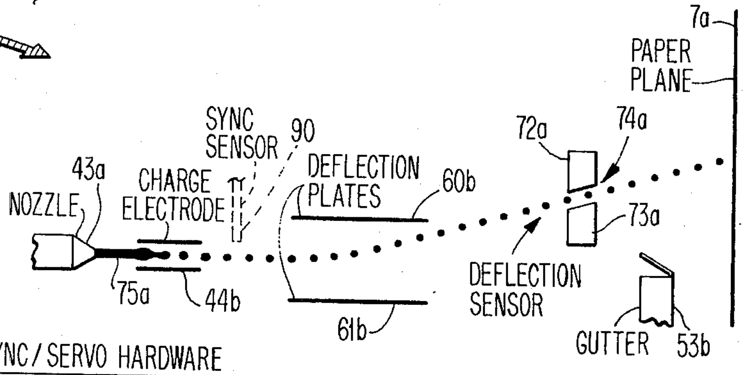
FIG. 5 illustrates another implementation of pedestal synchronization in conjunction with FIGS. 6a and 6b.
Figure 6A:
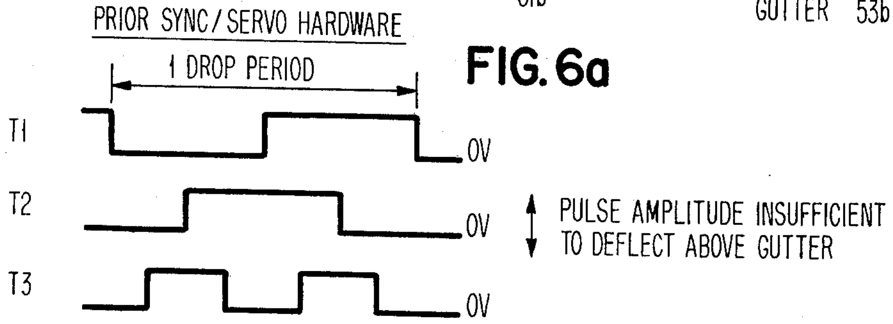
Figure 6B:
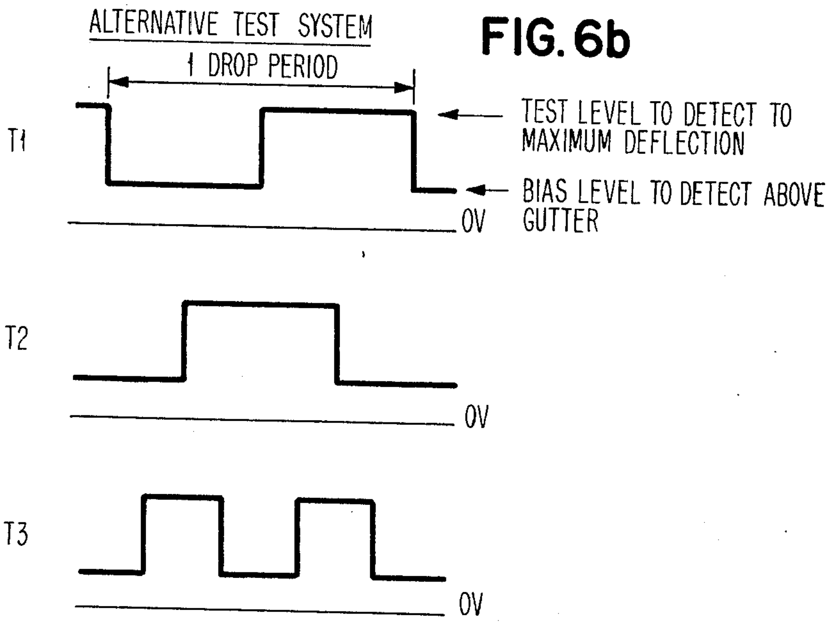

ALTERNATIVE EMBODIMENT OF FIGS. 5, 6*a*, and 6*b*

FIG. 5 illustrates several aspects of a prior synchronization scheme as well as an alternative synchronization technique. Pulse wave forms encountered with the prior scheme are illustrated in FIG. *6a* while those used with the alternative technique are shown in FIG. *6b*.

For the prior system all of the components shown in FIG. 5 are assumed to be mounted on carrier 5 in conjunction with ink jet head assembly 4. For the alternative system, the synchronization sensor only is assumed to be mounted separately to the right of the normal path of travel of carrier 5 and ink jet head assembly 4 in block 35, FIG. 1. The "on carrier" deflection sensor system can make use of all the sync methods described for "off carrier" sensor systems if a drop collection sump is provided.

Referring more specifically to FIG. 5, the various components include a nozzle 43*a* from which a stream 75*a* of ink drops is projected toward paper 7*a*. Drops are variably charged by charge electrode 44*b*, deflected by plates 60*b* and 61*b*, the combined action resulting in the correct placement of drops on paper 7*a*. Unused drops are directed to gutter 53*b*. The prior art synchronization and servo arrangements represented by waveforms in FIG. 6*a* make use of a synchronization sensor 90 while the alternative synchronization system represented by waveforms in FIG. 6*b* make use primarily of plates 72*a* and 73*a* having gap 74*a* therebetween.

In the aforesaid prior art version, the system synchronizes charging with breakoff time by applying test pulses shorter than the drop period to the charge electrode and observing whether or not the drops have charged by means of capacitive coupling to sensor 90, sensor 90 being in close proximity to the stream 75*a* immediately following the charge electrode 44*b*. Sensor 90 is subject to contamination from stray ink, which causes failure.

Ordinarily, in such a prior system, deflection height is sensed by plates 72*a* and 73*a* following the deflection plates. When the proper maximum deflection exists, the induced charge on electrodes is equal and a null is detected, as in FIG. 3*a*. A high charge used for maximum deflection results in a relatively large induced signal, so that the electrodes may be spaced relatively far from the stream. This results in less contamination and also allows the interposition of a shield when the deflection plates are not in use.

To avoid Sync contamination in one proposal, the lower plate 73*a* of the deflection electrode pair is used as a sync sensor. However, the greater stream to electrode spacing reduces the signal requiring higher gain electronics if the test drops are not deflected above gutter 53*b*. See FIG. 6*a*.

Another possibility as already discussed is to synchronize only at times when deflection servo cycles take place. Carrier 5 is positioned so that the test drops go into a special catcher such as catcher 71, as in FIG. 2. This allows use of sync pulse amplitudes resulting in deflection above the gutter and in greater induced signals. There is no convenient way to guarantee that test drops will not be caught by the pulse rise or fall, resulting in a charge such that the drops just clip the gutter 53 and spray contamination about.

In this version, and as illustrated in FIG. 6*b*, during Sync all drops are biased to a level sufficient to clear the gutter. The test pulse then induces a greater signal on the lower electrode than the bias. Setting a threshold which can discriminate between the bias and the test signal may be a difficult circuits problem for the low signal levels involved.

To avoid this difficulty, a bias level plus test pulses of amplitude sufficient to cause maximum deflection if the charge is in sync are provided. This allows use of the existing deflection null circuits to sense sync if deflection amplitude is correct. In contrast with the version in FIGS. 2 and 3*a*–3*e*, this version seeks a null output from plates 72*a* and 73*a*.

A possible difficulty is that deflection can drift more between servo cycles than will be corrected in one cycle. Therefore deflection amplitude may not be correct when Sync is tested. This can be handled by using a separate null detect circuit for Sync with a different threshold than the deflection servo null threshold, so that a null is detected over a broader range of deflection during sync testing.

Figure 7:
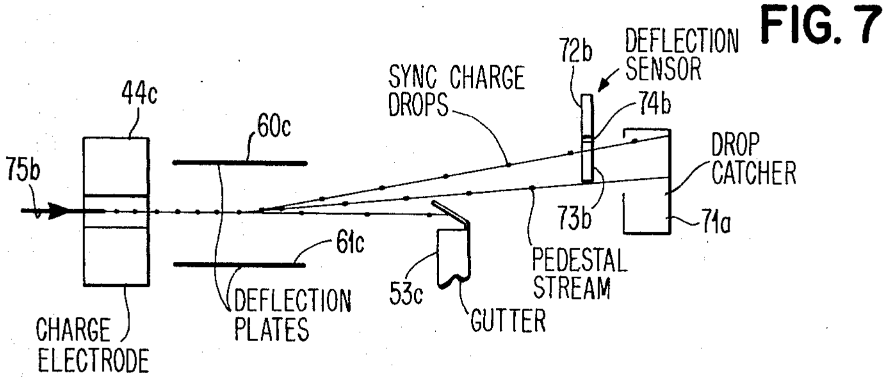
FIG. 7 illustrates still another implementation of pedestal synchronization in conjunction with FIGS. 8a and 8b.
Figure 8A:
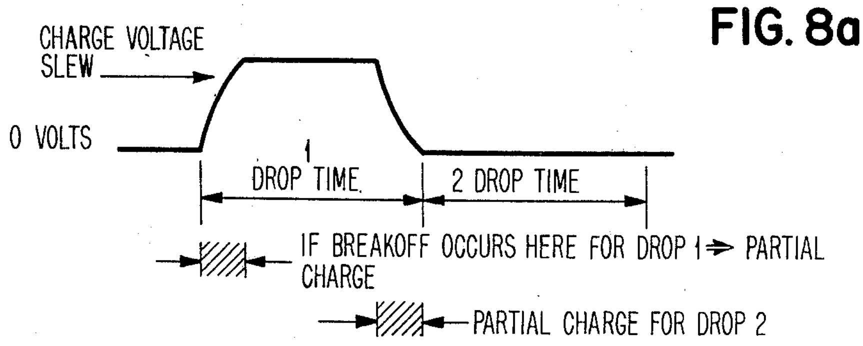
Figure 8B:
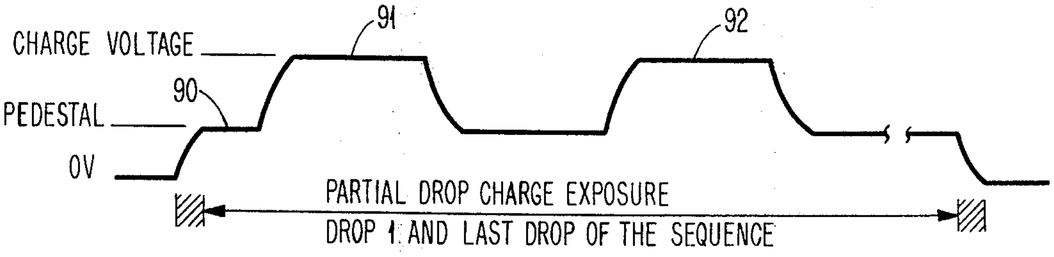

SECOND ALTERNATIVE EMBODIMENT OF FIGS. 7, 8*a*, and 8*b*

FIG. 7 illustrates still another embodiment using the general principles of the present invention for pedestal synchronization, but in a somewhat different way. The structures in FIG. 7 include a nozzle, not shown, for projecting a stream 75*b* of ink drops toward document 7, not shown. Other elements include charge electrode 44*c*, deflection plates 60*c* and 61*c*, gutter 53*c* and deflection sensor comprising upper plate 72*b*, lower plate 73*b* and gap 74*b*. It is assumed that this version makes use of the off-carrier assembly 35, such as shown in FIG. 1 and incorporates a drop catcher 71*a*. As previously demonstrated, partial drop charging occurs as illustrated in FIG. 8*a* which is comparable to FIG. 3*b*. For convenience and comparative purposes, FIG. 8*a* is included with FIG. 8*b*. FIG. 8*b* incorporates the pedestal concept having pedestal 90 and charge levels 91 and 92 illustrated. The arrangement in this version is such that a pedestal 90 is established sufficient to insure that the drops will clear gutter 53*c* while the synchronization pulses represented at 91 and 92 charge the drops an amount sufficient for them to pass by only the lower most plate 73*b* for detection.

SUMMARY

Figure 3A:
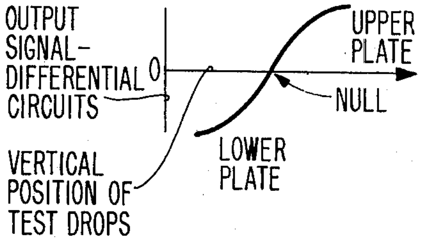

In summary, all embodiments utilize a pedestal voltage level from which the charge pulses are referenced in order to avoid partial charging of drops and impacting of the gutter. The first embodiment establishes a pedestal level to insure that pedestal drops pass by the lower deflection plate while synchronization drops pass by the upper deflection plate. This insures a significant change in signal level passing from lower plate signal through null to upper plate signal as illustrated in FIG. 3*a*. The second embodiment makes use of a pedestal level but synchronization drops pass in the gap area between the two deflection plates thus resulting in a null output for proper synchronization. This may be more difficult to detect than the complete change in signal level that occurs with the first embodiment. In the third embodiment, the pedestal drops clear the gutter but synchronization drops pass by only the lower deflection plate. This offers advantages in contrast with prior systems but as with the second embodiment, the detection of signal changes is somewhat more difficult to do. All of the embodiments, by making use of a pedestal reference level during synchronization procedures, solve the difficulties previously encountered.

While the invention has been particularly shown and described with reference to several embodiments, it will be understood by those skilled in the art that various changes in form and detail may be made without departing from the spirit and scope of the invention.

What is claimed is:

1. Synchronization apparatus for an ink jet printer having a gutter and a deflection sensor, comprising:

1. propelling means for producing a stream of ink drops to be charged, said propelling means propelling said ink drops in said stream in individual columns, each column having drop locations in a range from lowest to highest locations and including a mid-range, and wherein said drops are characterized as Print drops, Unused drops, and Sync drops;
2. charge-deflecting means for charging and deflecting said drops at charge levels in a range from lowest to highest corresponding to the range of lowest to highest locations in each column; said charge-deflecting means being operable;

2*a*. to charge and deflect Print drops in the mid-range of said range for each column in order to print information in successive columns on a document;

2*b*. to charge and deflect Unused drops in the lowest portion of said range thereby directing them to said gutter; and 2*c*. to charge and deflect Sync drops in the highest portion of said range by charge pulses that are referenced from a pedestal voltage level, thereby insuring fast rise times for said charge pulses and accurate charge levels on said ink drops and directing them past said deflection sensor whereby said Sync drops are capacitively coupled to said deflection sensor and produce signals therein representative of their relative locations, with respect to said sensor.

2. The apparatus of claim 1 further comprising:

1*b*. means for producing said Sync drops in a plurality of groups of drops designated Try 1, . . . Try *n*, the groups of drops being separated by intervals of pedestal voltage charge levels.

3. The apparatus of claim 1 further comprising:

1*b*. means for producing said Sync drops in a plurality of groups of drops, designated Try 1, . . . Try *n*, the groups of drops being separated by intervals of zero voltage charge levels.

4. The apparatus of claim 1 further comprising:

an ink catcher positioned to catch all of said Sync drops.

5. The apparatus of claim 2 further comprising:

servo control means associated with said synchronization control means and coupled to said charge and deflection means and operable during a servo mode to activate said charge and deflection means to charge a group of ink drops at a relatively high level and at a continuous charge level in order to establish initial pump drive.

6. The apparatus of claim 2 wherein:

said deflection sensor comprises a pair of deflection plates having a gap therebetween, said Sync drops ordinarily passing one of said plates, or the other of said plates, or in said gap area; and synchronization circuit means coupled to said deflection plates and providing a signal of a first characteristic when Sync drops pass one of said plates, a signal of a second characteristic when drops pass by the other of said plates and a null signal when drops pass in said gap area.

7. The apparatus of claim 6 wherein:

said charging and deflecting means is controlled by said synchronization means to charge drops at a first level producing signals of said first characteristic and a second level producing signals of said second characteristic from said deflection sensor.

8. The apparatus of claim 6 wherein:

said charging and deflecting means is controlled by said synchronization means to charge drops at a first level producing signals of said first characteristic and at a second level producing null signals from said deflection sensor.

9. The apparatus of claim 6 wherein:

said charging and deflecting means is controlled by said synchronization means to charge drops at a first level producing signals of said first characteristic of relatively lower amplitude and at a second level producing signals of said first characteristic of a relatively higher amplitude from said deflection sensor.

10. A synchronization method for an ink jet printer having a deflection sensor, a gutter and an ink catcher located in the direction of stream travel beyond said gutter, comprising the steps of:

1. producing a stream of ink drops to be charged;

1*a*. propelling said ink drops in said stream in individual columns, each column having drop locations in a range from lowest to highest locations and including a mid-range, and wherein said drops are characterized as Print drops, Unused drops, and Sync drops;

2. charging and deflecting said drops at charge levels in a range from lowest to highest corresponding to the range of lowest to highest locations in each column;

2*a*. charging and deflecting Print drops in the mid-range of said range for each column in order to print information in successive columns on a document;

2*b*. charging and deflecting Unused drops in the lowest portion of said range thereby directing them to said gutter; and 2*c*. charging and deflecting Sync drops in the highest portion of said range by charge pulses that are referenced from a pedestal voltage level, thereby insuring fast rise times for said charge pulses and accurate charge levels on said ink drops and directing them past said deflection sensor to said ink catcher located beyond said gutter, whereby said Sync drops are capacitively coupled to said deflection sensor and produce signals therein representative of their relative locations with respect to said sensor.

11. The method of claim 10 further comprising:

1*b*. producing said Sync drops in a plurality of groups of drops, designated Try 1, Try *n*, the groups of drops being separated by intervals of pedestal voltage charge levels.

12. The method of claim 10 further comprising:

1*b*. producing said Sync drops in a plurality of groups of drops, designated Try 1, . . . Try *n*, the groups of drops being separated by intervals of zero voltage charge levels.

* * * * *

UNITED STATES PATENT AND TRADEMARK OFFICE

CERTIFICATE OF CORRECTION

PATENT NO. : 3,992,713

DATED : November 16, 1976

INVENTOR(S) : John Michael Carmichael, et al.

It is certified that error appears in the above-identified patent and that said Letters Patent are hereby corrected as shown below:

Column 7, line 45 delete "2" and insert --1--. Column 7, line 53 delete "2" and insert --1--.

Signed and Sealed this

Fifteenth Day of February 1977

[SEAL]

Attest:

RUTH C. MASON
*Attesting Officer*

C. MARSHALL DANN
*Commissioner of Patents and Trademarks*